(12) United States Patent
McBride (10) Patent No.: US 6,175,909 B1
(45) Date of Patent: Jan. 16, 2001

(54) FORWARDING INSTRUCTION BYTE BLOCKS TO PARALLEL SCANNING UNITS USING INSTRUCTION CACHE ASSOCIATED TABLE STORING SCAN BLOCK BOUNDARY INFORMATION FOR FASTER ALIGNMENT

(75) Inventor: Andrew McBride, Austin, TX (US)

(73) Assignee: Advanced Micro Devices, Inc., Sunnyvale, CA (US)

( * ) Notice: Under 35 U.S.C. 154(b), the term of this patent shall be extended for 0 days.

(21) Appl. No.: 09/243,223

(22) Filed: Feb. 2, 1999

(51) Int. Cl.[7] ....................................................... G06F 9/38

(52) U.S. Cl. ........................... 712/204; 712/210; 712/213

(58) Field of Search ..................................... 712/204, 210, 712/213

(56) References Cited

U.S. PATENT DOCUMENTS

| 5,748,978 | 5/1998 | Narayan et al. | 712/23 |
|---|---|---|---|
| 5,875,315 | * 2/1999 | Narayan | 712/204 |
| 5,986,163 | * 10/1999 | Narayan et al. | 712/204 |
| 5,991,869 | * 11/1999 | Tran et al. | 712/204 |

FOREIGN PATENT DOCUMENTS

| 0 651 324 | 5/1995 | (EP) . |
|---|---|---|
| 0 798 632 | 10/1997 | (EP) . |

OTHER PUBLICATIONS

"Dual On–Chip Instruction Cache Organization in High Speed Processors," IBM Technical Disclosure Bulletin, vol. 37, No. 12, Dec. 1994, pp. 213–214.

* cited by examiner

Primary Examiner—Kenneth S. Kim
(74) Attorney, Agent, or Firm—Conley, Rose & Tayon, PC; Dan R. Christen (57) ABSTRACT

A microprocessor configured to use historical scan information to speed instruction scanning is disclosed. The microprocessor may comprise an instruction cache, a scanning history table, routing logic, and two or more scanning units. The instruction cache is configured to output sequences of stored instruction bytes in response to receiving corresponding fetch addresses. The scanning history table, which may also receive the fetch addresses, is configured to output corresponding stored scan block boundary information. The routing logic, which is coupled between the instruction cache, scanning history table, and scanning units, is configured to route the first N instructions to the first scanning unit, and the second N instructions to the second scanning unit, wherein N is a predetermined integer greater than one. The scanning units are configured to operate independently and in parallel. The scanning history information may be initially stored in the scanning history table by a predecode unit coupled between the instruction cache and a memory subsystem. Alternatively, the scanning units may scan the instructions in a traditional manner during a first access and then store the scan information in the scanning history table for subsequent accesses. The scan history information may be stored in the scan history table as scan block indicator bits or as byte counts associated with a particular fetch address. A computer system and method for scanning instructions are also disclosed.

20 Claims, 10 Drawing Sheets

FORWARDING INSTRUCTION BYTE BLOCKS TO PARALLEL SCANNING UNITS USING INSTRUCTION CACHE ASSOCIATED TABLE STORING SCAN BLOCK BOUNDARY INFORMATION FOR FASTER ALIGNMENT

BACKGROUND OF THE INVENTION

1. Field of the Invention

This invention relates to scanning variable-length instructions within a microprocessor.

2. Description of the Relevant Art

The number of software applications written for the x86 instruction set is immense. As a result, despite the introduction of newer and more advanced instruction sets, microprocessor designers have continued to design microprocessors capable of executing the x86 instruction set.

Figure 1:
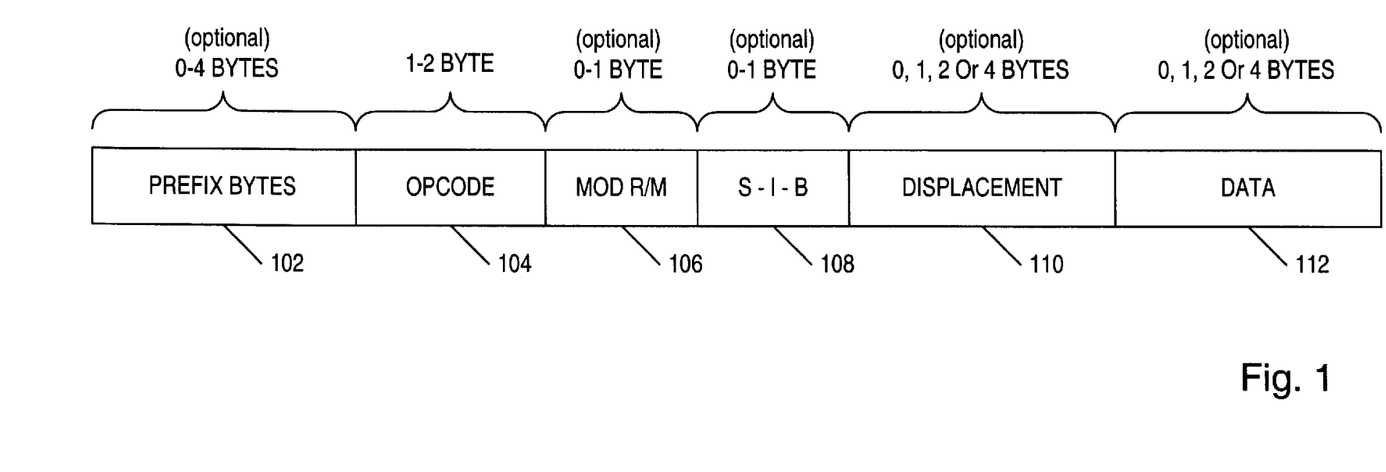
FIG. 1 is a block diagram illustrating the generic format of the x86 instruction set.

The x86 instruction set is relatively complex and is characterized by a plurality of variable-length instructions. A generic format illustrative of the x86 instruction set is shown in FIG. 1. As the figure illustrates, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more of the optional prefix bytes 102. For example, one of prefix bytes 102 may be used to change the address or operand size for an instruction, to override the default segment used in memory addressing, or to instruct the processor to repeat a string operation a number of times. The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions makes scanning, aligning, and decoding instructions difficult. Scanning refers to reading a group of instruction bytes (either from an instruction cache within the microprocessor or from an external memory) and determining the boundaries of instructions contained therein. Alignment refers to the process of masking off the undesired instruction bytes and shifting the desired instruction so that the first bit of the desired instruction is in the desired position. Decoding instructions typically involves identifying each field within a particular instruction, e.g., the opcode and operand fields. Decoding typically takes place after the instruction has been fetched from the instruction cache, scanned, and aligned.

One method for determining the boundaries of instructions involves generating a number of predecode bits for each instruction byte read from main memory. The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions with the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted.

Figure 2:
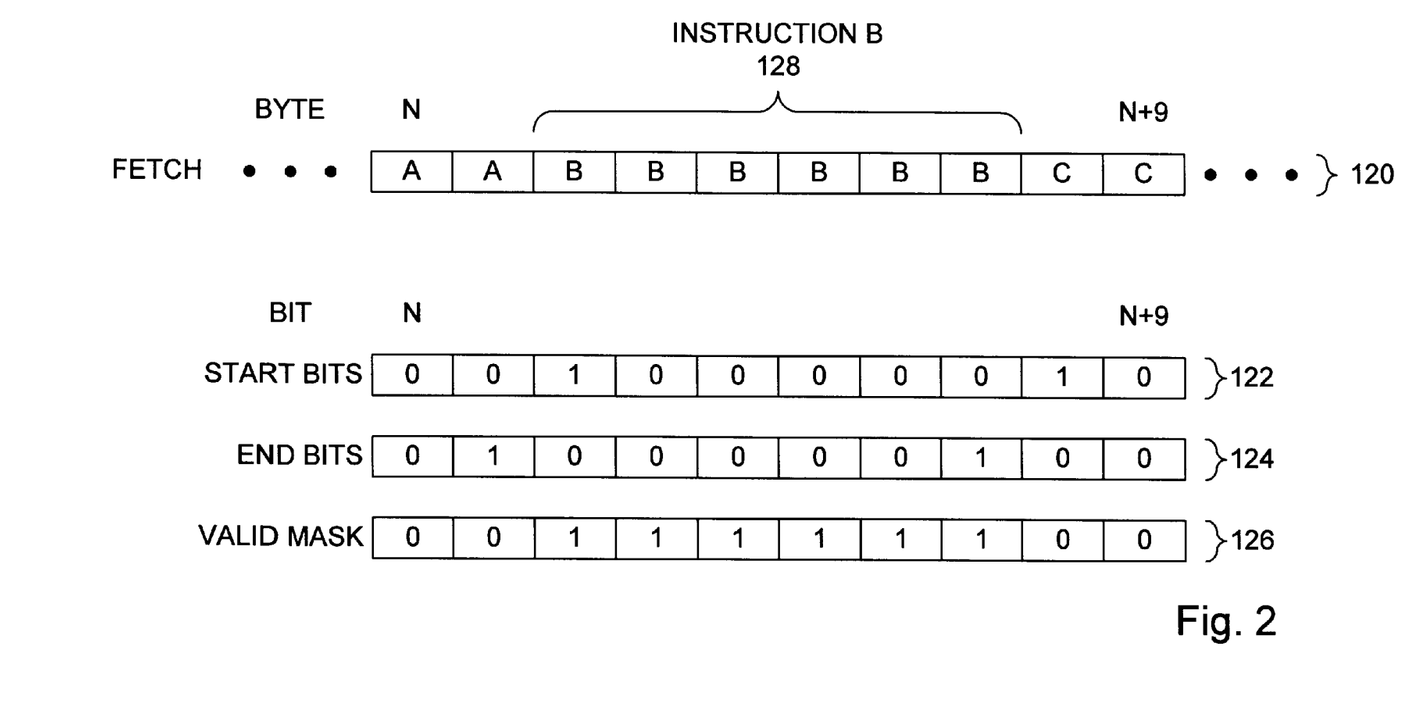
FIG. 2 is a block diagram illustrating one embodiment of a valid mask.

Turning now to FIG. 2, an exemplary valid mask is shown. The figure illustrates a portion of a fetch block 120 and its associated start and end bits 122 and 124. Assuming a valid mask 126 for instruction B 128 is to be generated, start and end bits 122 and 124 would be used to generate the mask. Valid mask 126 could then be used to mask off all bytes within fetch 120 that are not part of instruction B 128. Once the boundaries of an instruction have been determined, alignment and decoding may be performed.

Unfortunately, the task of scanning x86 instructions typically requires a number of cascaded levels of logic. Thus, scanning may require a significant amount of time and, when added to the time required to perform alignment and decoding, may create a significant delay before any instructions are available to the functional stages of the microprocessor's pipeline. As microprocessors increase the number of instructions they are able to execute per clock cycle, slow instruction scanning may become a performance limiting factor. Therefore, a mechanism for simplifying the complexity and time required for instruction scanning is needed.

SUMMARY OF THE INVENTION

The problems outlined above may in part be solved by a microprocessor capable of using stored scanning history information. Broadly speaking, in one embodiment the microprocessor comprises: an instruction cache, a scanning history table, and two or more scanning units. The instruction cache may be configured to store instruction bytes received from a main system memory. The scanning history table may be configured to store scanning information indicative of where every "Nth" instruction begins in the instruction cache, wherein N is a predetermined integer greater than one. Once stored, the scanning information may be used to route instruction bytes that are fetched from the instruction cache to the scanning units. The stored scanning information may, in some embodiments, increase the number of instructions that may be scanned in a particular time period by allowing parallel scanning. In some embodiments, the stored scan information may also improve each scanning unit's ability to operate in parallel and independently from the other scanning unit(s). This may also reduce the possibility of one scanning unit stalling while waiting for portions of instructions from another scanning unit.

In one embodiment, the microprocessor may be configured to route requested fetch addresses to both the instruction cache and the scanning history table. When the instruction cache receives a fetch address, it may respond by outputting a plurality of corresponding sequential instruction bytes. The scanning history table may respond by outputting corresponding scanning information indicative of the start of the Nth instruction after the fetch address (i.e., scan block boundary information). The microprocessor may use the scanning information output by the scanning history table to route the first N instructions beginning at the fetch address to the first scanning unit. The second N instructions after the fetch address may be similarly routed to the second scanning.

In another embodiment, the microprocessor comprise two or more scanning units configured to operate in parallel, wherein the first scanning unit is configured to receive instruction bytes from the instruction cache that occur before the first scan block boundary, and wherein the second scanning unit is configured to receive instruction bytes from the instruction cache the occur after the first scan block boundary and before the second scan block boundary.

A method for scanning instructions using stored scan history information is also contemplated. In one embodiment, the method may comprise reading a plurality of instruction bytes from a main memory into an instruction cache and generating scan block boundary indicator bits for the plurality of instruction bytes. The scan block indicator bits may be stored into a scan history table. A fetch address may be used to access the instruction cache and scan history table. Instruction bytes from the instruction cache may be routed to two or more parallel scan units according to the scan block indicator bits output by the scan history table.

In another embodiment, the method may comprise reading a plurality of instruction bytes from an instruction cache using a fetch address. A scan history table may be searched to determine if scan history information corresponding to the fetch address is stored therein. If not, the instruction bytes may be scanned serially with the newly generated scan history information being stored in the scan history table. However, if corresponding scan history information is stored in the scanning history table, then the instruction bytes may be divided into two or more scan blocks for parallel scanning. The corresponding scan history information may be used to determine where to divide the instruction bytes.

A computer system capable of storing scan history information is also contemplated. The computer system may comprise a microprocessor as described above, a CPU bus coupled to the microprocessor; and a communications device (e.g., a modem) coupled to the microprocessor via the CPU bus. In one embodiment, the computer system may have multiple microprocessors coupled to each other via the CPU bus.

BRIEF DESCRIPTION OF THE DRAWINGS

Other objects and advantages of the invention will become apparent upon reading the following detailed description and upon reference to the accompanying drawings in which.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 3:
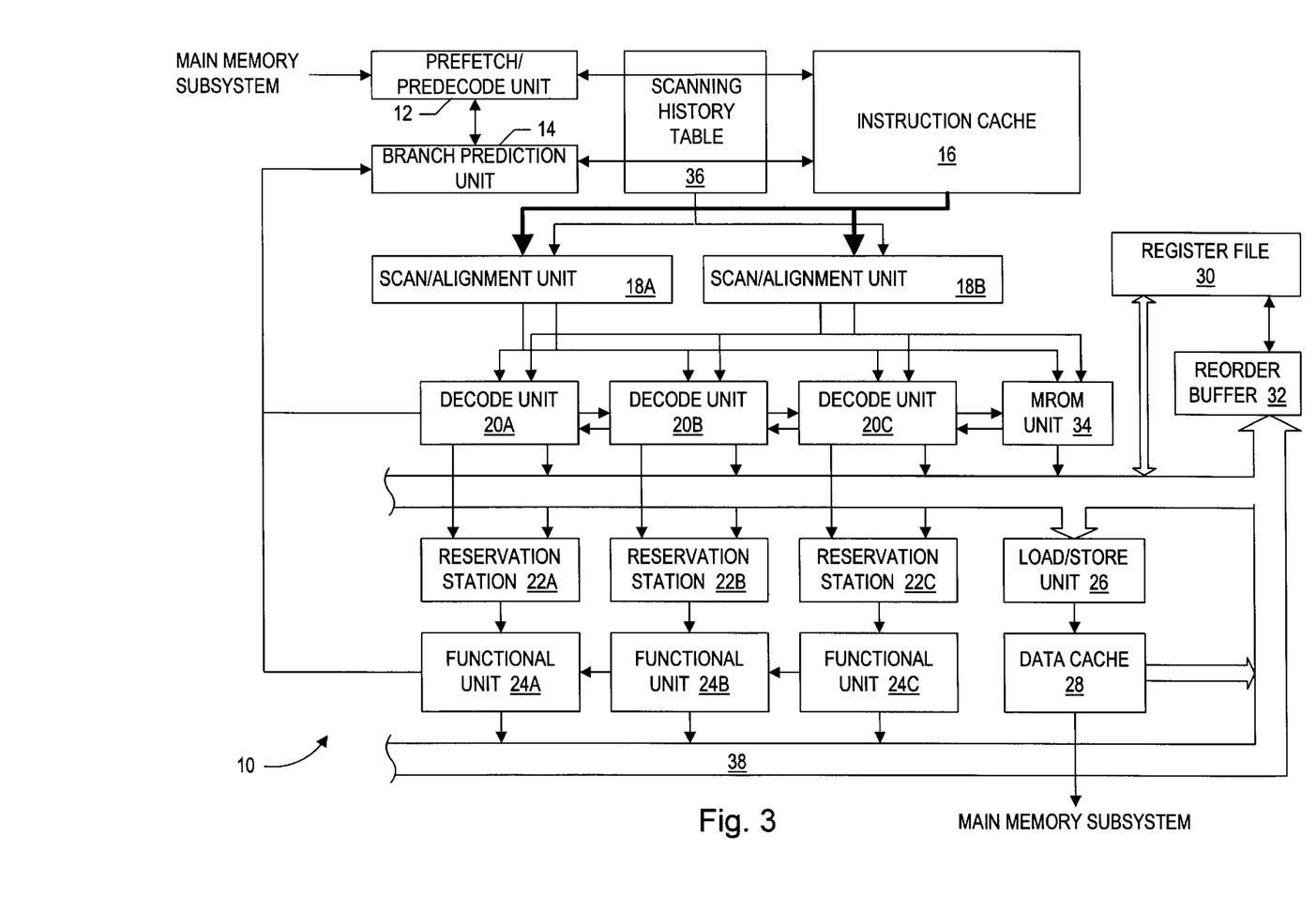
FIG. 3 is a block diagram illustrating one embodiment of a microprocessor configured to store scan history information.

Turning now to FIG. 3, a block diagram of one embodiment of a microprocessor 10 that is configured to store scan history information is shown. In this embodiment, microprocessor 10 includes a prefetch/predecode unit 12, a branch prediction unit 14, and a scan history table 36 coupled to an instruction cache 16. Scan units 18A and 18B are coupled between instruction cache 16, decode units 20A–C, and a microcode read-only memory (MROM) unit 34. Decode units 20A–C and MROM unit 34 are coupled to reservation stations 22A–C, which are in turn coupled to functional units 24A–C. A reorder buffer 32 is coupled to a register file 30, and a load/store unit 26 is coupled to a data cache 28. Functional units 24A–C, data cache 28, load store unit 26, reorder buffer 32, register file 30, MROM unit 34, decode units 20A–C, and reservation stations 22A–C are coupled together by result bus 38.

Generally speaking, instruction cache 16 is a high speed cache memory provided to temporarily store instructions before they are fetched and conveyed to scan/align units 18A–B. In one embodiment, instruction cache 16 is configured to store up to 32 kilobytes of instruction code organized in cache lines of sixteen bytes each (where each byte consists of eight bits). Cache lines represent the smallest resolution for writes to instruction cache 16. For example, a sixteen byte cache lines means each write to instruction cache 16 will involve storing one or more sixteen byte blocks of instruction bytes. Instruction bytes are stored in instruction cache 16 by prefetch/predecode unit 12, which prefetches the desired bytes from a main memory (not shown). It is noted that instruction cache 16 could be implemented in a set-associative, fully-associative, or direct-mapped configuration.

Prefetch/predecode unit 12 prefetches instruction code from the main memory for storage within instruction cache 16. In one embodiment, prefetch/predecode unit 12 is configured to burst 64-bit wide code from the main memory into instruction cache 16. A variety of specific code prefetching techniques and algorithms may be employed by prefetch/ predecode unit 12.

In one embodiment, as prefetch/predecode unit 12 fetches instructions from the main memory, it generates the following predecode bits for each instruction byte: a start bit, an end bit, and a functional bit. As previously noted, asserted start bits mark the first byte of each instruction, while asserted end bits mark the last byte of each instruction. Asserted functional bits mark the opcode bytes of each instruction. The predecode bits form tags which may be used to speed alignment and decoding. The predecode tags may also include additional information such as whether a particular instruction may be decoded directly by decode units 20A–B or whether the instruction is to be executed by invoking a microcode procedure stored within MROM unit 34. The predecode tags may be stored along with the instruction bytes in instruction cache 16.

In addition to generating predecode bits, prefetch/ predecode unit 12 may also generate scan block indicator bits for each series of instruction bytes that are conveyed to instruction cache 16. Scan block indicator bits perform a function somewhat akin to the predecode start bits, but instead of marking the beginning of each instruction, scan block indicator bits mark the beginning of every "Nth" instruction, wherein N is a predetermined integer greater than one. For example, prefetch/predecode may generate one scan block indicator bit for every instruction byte, but assert only the indicator bits that correspond to the first instruction byte of every third instruction (i.e., N equals three). Prefetch/predecode unit 12 may store the scan block indicator bits in scanning history table 36.

In subsequent clock cycles, the scan block indicator bits may then be used to allow parallel scanning. For example, assuming instruction cache 16 receives a fetch address that "hits" (i.e., references instruction bytes that are stored within instruction cache 16), it will output a number of instruction bytes (e.g., a 16-byte cache line) to scan/alignment units 18A–B. The fetch address may also be routed to scanning history table 36, which outputs a series of scan block indicator bits corresponding to the instruction bytes output by instruction cache 16. Scan/alignment units 18A–B may use the scan block indicator bits to determine how to divide the instruction bytes so that each scan/alignment unit may work independently and in parallel. For example, scan/ alignment unit 18A may be configured to receive instruction bytes corresponding to byte positions before the first asserted scan block indicator bit, while scan/alignment unit 18B may be configured to receive instruction bytes correspond to byte positions equal with or after the first asserted scan block indicator bit.

During normal operation, scan/alignment unit 18A may be configured to receive the first N instructions corresponding to the fetch address. Scan/alignment unit 18B may be similarly configured to receive the second set of N instructions (i.e., the first N instructions after the first asserted scan block indicator bit). Scan/alignment units 18A–B may each be configured to receive and scan the corresponding predecode information, determine the boundaries of each of their respective instructions, shift (align) each instruction, and then output the individual instructions to decode units 20A–C. In one embodiment, scan/alignment units 18A–B may also be configured to detect predecode tags indicative of MROM instructions (i.e., instructions that are executed by invoking a sequence of microcode instructions) and route them to MROM unit 34.

Before describing the operation of scanning history table 36, instruction cache 16, and scan/alignment units 18A–B in greater detail, other general aspects of microprocessor 10 will be discussed. Note the configurations illustrated below are meant for explanatory purposes only. Other configurations of microprocessor 10 are possible and contemplated For example, instead of implementing instruction cache 16 and data cache 28 separately as shown, in some embodiments a unified instruction and data cache may be used.

Decode units 20A–C are configured to receive aligned instructions from scan/alignment units 18A–B and decode them into an internal, bit-encoded, fixed-length format. In one embodiment, each decode unit 10A–C may be configured to receive and decode one or more instructions per clock cycle.

To improve the flow of data from instruction cache 16 to decode units 20A–C, each decode unit may have a FIFO (first-in first-out) memory buffer at its input to receive and store the aligned instructions until the respective decode unit is ready to begin decoding them. For example, each decode unit may have a 32-byte FIFO configured to store two instructions (each up to a maximum of sixteen bytes long). Note that decode units 20A–C are drawn as single boxes for exemplary purposes only. Each decode unit 20A–C may comprises a number of individual decoders each configured to decode a single instruction.

Microprocessor 10 may be configured to support out of order execution, and thus employ reorder buffer 32 to keep track of the original program sequence for register read and write operations, to implement register renaming, to allow for speculative instruction execution and branch misprediction recovery, and to facilitate precise exceptions. As will be appreciated by those of skill in the art, a temporary storage location for storing speculative register states is reserved within reorder buffer 32 upon decode of an instruction that involves the update of a register. Reorder buffer 32 may be implemented in a first-in-first-out (FIFO) memory wherein speculative results move to the "bottom" of the buffer as they are validated and written to the register file, thus making room for new entries at the "top" of the buffer. Other specific configurations of reorder buffer 32 are also possible, as will be described further below. If a branch prediction is incorrect, the results of speculatively-executed instructions along the mispredicted path can be invalidated in the buffer before they are written to register file 30.

The bit-encoded execution instructions and immediate data provided at the outputs of decode units 20A–20C are routed directly to respective reservation station units 22A–22C. In one embodiment, each reservation station unit 22A–22C is capable of holding instruction information (i.e., bit encoded execution bits as well as operand values, operand tags and/or immediate data) for up to three pending instructions awaiting issue to the corresponding functional unit. It is noted that for the embodiment shown in the figure, each decode unit 20A–20C is associated with a dedicated reservation station unit 22A–22C, and that each reservation station unit 22A–22C is similarly associated with a dedicated functional unit 24A–24C. Accordingly, three dedicated "issue positions" are formed by decode units 20A–C, reservation station units 22A–C and functional units 24A–C. Instructions aligned and dispatched to issue position 0 through decode unit 20A arc passed to reservation station unit 22A and subsequently to functional unit 24A for execution. Similarly, instructions aligned and dispatched to decode unit 20B are passed to reservation station unit 22B and into functional unit 24B, and so on.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or tag) is provided from reorder buffer 32 rather than from register file 30. If there is no location reserved for a required register in reorder buffer 32, the value is taken directly from register file 30. If the operand corresponds to a memory location, the operand value is provided to the reservation station unit through load/store unit 26.

Reservation station units 22A–22C are provided to temporarily store instruction information to be speculatively executed by the corresponding functional units 24A–24F. As stated previously, each reservation station unit 22A–22F may store instruction information for up to three pending instructions. Each of the three reservation stations 22A–22C contain locations to store bit–encoded instructions to be speculatively executed by the corresponding functional unit and the values of operands. If a particular operand is not available, a tag for that operand is provided from reorder buffer 32 and is stored within the corresponding reservation station 22A–22C until the result has been generated (i.e., by completion of the execution of a previous instruction). It is noted that when an instruction is executed by one of the functional units 24A–24C, the result of that instruction is passed directly to any reservation stations 22A–22C that are waiting for that result at the same time the result is passed to update reorder buffer 32 (this technique is commonly referred to as "result forwarding").

Instructions are issued to their corresponding functional units for execution after the values of any required operand (s) are made available. In some cases, an operand associated with a pending instruction within one of reservation station units 22A–22C will be tagged with the location of a previous result value stored in reorder buffer 32 that corresponds to an instruction which modifies the required operand. In this situation the instruction is not issued to the corresponding functional unit 24A–C until the operand result for the previous instruction has been received. Accordingly, the order in which instructions are executed may not be the same as the order of the original program instruction sequence (i.e., they may be executed "out-of-order"). Reorder buffer 32 ensures that data coherency is maintained in situations where read-after-write dependencies occur.

In one embodiment, each of the functional units 24A–C is configured to perform integer arithmetic operations of addition and subtraction, as well as shifts, rotates, logical operations, and branch operations. It is noted that a floating point unit (not shown) may also be employed to accommodate floating point operations.

Each of the functional units 24A–C also provide information regarding the execution of conditional branch instructions to branch prediction unit 14. If a branch prediction was incorrect, branch prediction unit 14 flushes instructions after the mispredicted branch that have entered the instruction processing pipeline, and causes prefetch/predecode unit 12 to fetch the required instructions from instruction cache 16 or main memory. In this situation, the results of executed instructions occurring after the mispredicted branch instruction are discarded, including those which were speculatively executed and temporarily stored in load/store unit 26 and reorder buffer 32.

Results produced by functional units 24A–C are sent to reorder buffer 32 if a register value is being updated, and to load/store unit 26 if the contents of a memory location is changed. If the result is to be stored in a register, reorder buffer 32 stores the result in the location reserved for the value of the register when the instruction was decoded. As stated previously, results are also broadcast to reservation station units 22A–22C where pending instructions may be waiting for the results of previous instruction executions to obtain the required operand values.

Generally speaking, load/store unit 26 provides an interface between functional units 24A–24C and data cache 28. In one embodiment, load/store unit 26 is configured with a load/store buffer with eight storage locations for data and address information for pending loads or stores. Decode units 20A–C arbitrate for access to the load/store unit 26. When the buffer is full, decode units 20A–C must wait until more storage space becomes available in load/store unit 26 for additional load or store requests. Load/store unit 26 also performs dependency checking for load instructions against pending store instructions to ensure that data coherency is maintained.

Data cache 28 is a high speed cache memory provided to temporarily store data being transferred between load/store unit 26 and the main memory subsystem. In one embodiment, data cache 28 has a capacity of storing up to 32 kilobytes of data. It is understood that data cache 28 may be implemented in a variety of specific memory configurations, including set-associative, direct mapped, and fully-associative configurations.

Scanning History Table

Figure 4A:
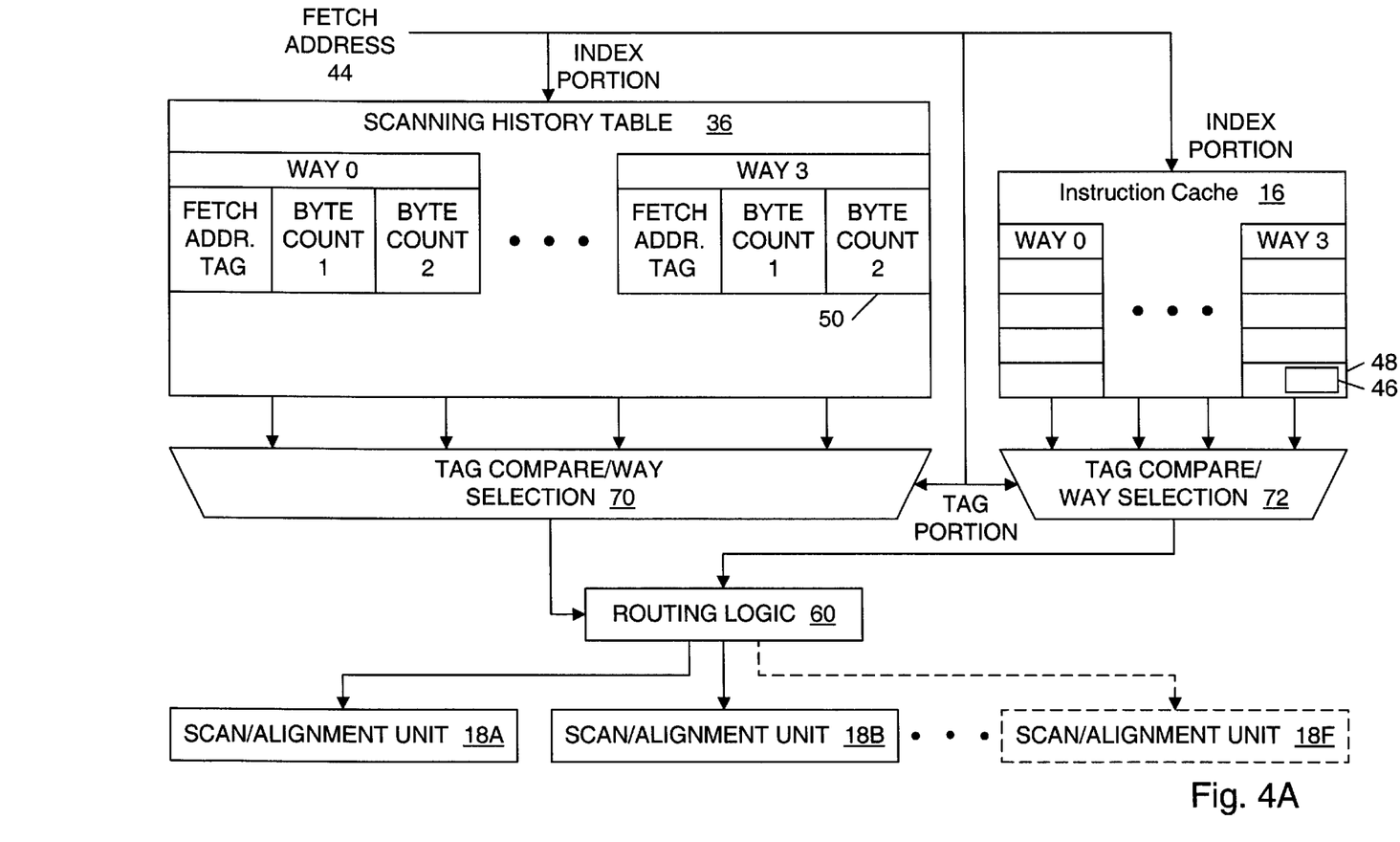
FIG. 4A is a block diagram illustrating details of one embodiment of the scan history table from FIG. 3.

Turning now to FIG. 4A, details of one embodiment of scanning history table 36 are shown. In this embodiment, scanning history table 36 is configured to mirror the configuration of instruction cache 16. As shown in the figure, both instruction cache 16 and scanning history table 36 have four-way set-associative configurations. Note that other configurations are also possible (e.g., 8-way or direct mapped). When a fetch address 44 accesses instruction cache 16, the same address may be used in parallel to access scan history table 36. Thus, while instruction cache 16 is outputting a fetch block 46, scan history table 36 may be outputting one or more "byte counts" (e.g., byte count 50) corresponding to fetch address 44. A byte count is a counter that indicates the number of bytes that comprises the first N instructions for a particular fetch address. As previously noted, N is a predetermined integer greater than one that represents the desired number of instructions to scanned and aligned by each scan/align unit.

Note, as used herein a "fetch block" may comprise an entire cache line in instruction cache 16, or merely a portion thereof. For example, if a fetch address points to a particular target byte in the middle of a cache line, instruction cache 16 may output a fetch block that comprises only the instruction bytes from the particular target byte to the end of the cache line. Furthermore, if a branch instruction within the cache line is predicted taken, instruction cache 16 may output a fetch block comprising only the instruction bytes between the particular target byte and the predicted taken branch instruction. As the figure illustrates, fetch block 46 comprises only a subset of cache line 48.

In some embodiments, scan history table 36 may store more than one byte count for each fetch address as shown in the figure. The second byte count stores the number of instruction bytes that comprises the second set of N instructions for the particular fetch address. The second and subsequent byte counts stored for each fetch address may be particularly useful when more than two scan/alignment units are used (e.g., scan/alignment unit 18F). Advantageously, the byte counts provide routing logic with the exact number of bytes that should be routed from instruction cache 16 to each scan/alignment unit 18A–F. For example, if a particular entry within scan history table 36 is storing a first byte count of five and a second byte count of six, then routing logic will route the first five bytes (i.e., bytes 0–4) from instruction cache 16 to scan/alignment unit 18A and the next six bytes (i.e., bytes 5–10) from instruction cache 16 to scan/alignment unit 18B. Any extra bytes may be routed to third or subsequent scan/alignment units (e.g., scan/alignment unit 18N).

Figure 4B:
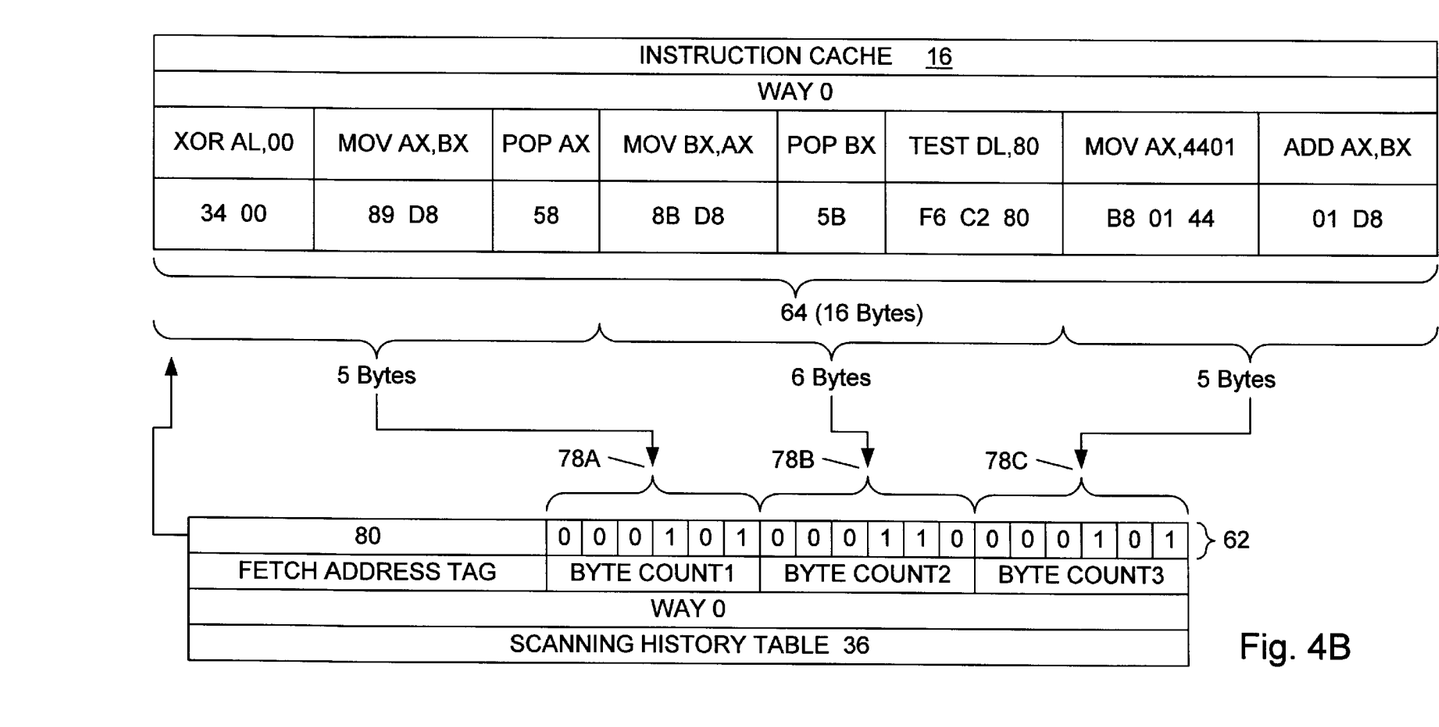
FIG. 4B is a block diagram illustrating details of another embodiment of the scan history table from FIG. 3.

Turning now to FIG. 4B, more details of one embodiment of scanning history table 36 are shown. This figure shows one exemplary encoding of byte counts within scanning history table 36. Entry 62 comprises a fetch address tag field 80 and three byte count fields 78A–C. Each byte count field 78A–C comprises six bits. Other lengths may be used, depending upon the number of instructions per scan block. For example, in the x86 architecture the maximum instruction length is sixteen bytes. Thus, the maximum length for three instructions is 48 bytes. Accordingly, six bits is the minimum number of bits within which to encode the possible length of three instructions.

As the figure illustrates, byte count 78A has a value of five and corresponds to the first three instructions stored after the fetch address in instruction cache 16. Byte count 78B has a value of six and corresponds to the next three instructions after the fetch address. Note that byte counts 78A and 78B are optional. In some embodiments, scanning history table 36 may be configured to store only one byte count per fetch address tag. In such embodiments, the value of the byte count indicates the number of instruction bytes to be routed to the first scan/align unit (e.g., scan/align unit 18A), and any remaining instruction bytes are routed to the second scan/align unit (e.g., scan/align unit 18B). In other embodiments scan history table 36 may be configured to store one byte count for each scan/align unit in microprocessor 10.

Note that the bytes counts (and the scan block indicator bits) described above are merely predictions. They may be generated during predecode, or they may be generated during the first time the instruction bytes are fetched from instruction cache 16, i.e., during an initial scan/alignment cycle. If the predicted byte counts or scan block indicator bits are incorrect, routing logic 80 or scan history update unit 74 may be configured to detect the inaccuracy and signal scan/align units 18A–F accordingly. In another embodiment, each scan/align unit and or decode unit may be configured to detect when a byte count (or scan block indicator bit) is incorrect.

If no byte counts corresponding to the fetch address are stored in scanning history table 36 (e.g., upon an initial scan), then routing logic 80 may convey a predetermined number of bytes to each scanning unit and signal that no valid scanning history information is available. In such a case, the instruction bytes are scanned in a traditional manner (e.g., serially) and the information stored within scanning history table 36 is updated accordingly. In another embodiment, routing logic 80 may be configured to count start and or end bits "on the fly" in order to route N instructions to each scan/align unit. This may, however, require extra clock cycles in some implementations.

In some instances, the final bytes of the cache line output by instruction cache 16 may be part of an instruction that is split across two cache lines. To address this situation, scan/align unit 18A may be configured to store these partial instruction bytes until the next clock cycle when the remaining bytes of the instruction are received (i.e., as the first bytes of the next cache line output by instruction cache 16). Alternatively, instruction cache 16 or routing logic 80 may be configured to store the partial instruction until the next clock cycle. Yet another alternative may include a specialized scan unit (not shown) that is optimized for dealing with split instructions. When an instruction extends beyond the end of a cache line, a corresponding signal is conveyed to prefetch/predecode unit 12 (e.g., by one of scan/align units 18A–B or by instruction cache 16). This signal causes prefetch/predecode unit 12 to fetch the next sequential cache line from instruction cache 16. The presence of an instruction that extends beyond the end of the cache line may be detected by examining the corresponding predecode bits. Any instruction bytes after the final asserted end bit belong to instructions that extend beyond the end of the cache line.

Out of Order Scanning and Decoding

Figure 5:
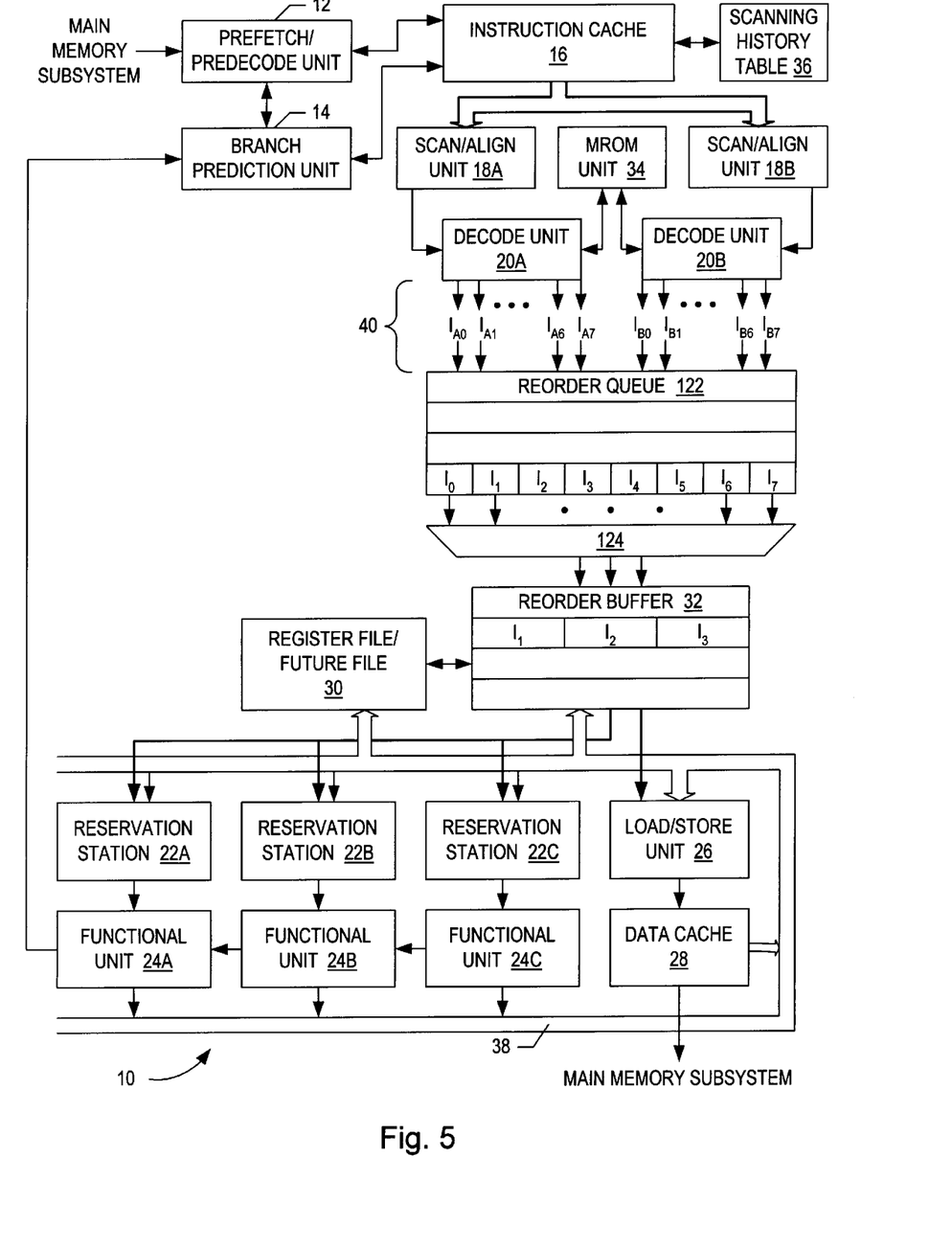
FIG. 5 is a block diagram illustrating another embodiment of a microprocessor configured to store scan history information.

Turning now to FIG. 5, details of another embodiment of microprocessor 10 are disclosed. This embodiment of microprocessor is configured to both scan and decode instructions out of program order. As in the previously disclosed embodiment, scanning history table 36 stores historical information regarding scan points. In one embodiment, this information may be stored as scan block indicator bits generated by prefetch/predecode unit 12. In another embodiment, this information may be stored as byte counts, each associated with a particular fetch address.

In one embodiment, scanning history table 36 may be implemented entirely within instruction cache 16 by allocating a single bit storage location for each instruction byte. The single storage locations may store scan block indicator bits that allow scan/align units 18A–B to each select a subset of the instruction bytes output by instruction cache 16. If the scan block indicator bits are correctly set, then no instructions are split between scan/align units 18A–B. Without correct scan block indicator bits, however, instructions may be split between scan/align units. Splitting instructions across scan/align units may, in some embodiments, hinder performance by leading to greater interdependence between the scan/align units. This is because the instructions split across scan/align units may have to be reassembled before scanning and alignment can be completed. Thus, one scan/align unit may stall while waiting for instruction bytes routed to another scan/align unit.

Decode units 20A–B may be configured to receive the aligned instructions from scan units 18A–B and decode them in parallel. For example, if decode unit 20B completes decoding a set of instruction bytes before decode unit 20A completes decoding its set of instruction bytes, then decode unit 20B may accept a new set of instruction bytes from scan/alignment units 18A–B. Decode unit 20B may begin decoding those instructions while decode unit 20A is still busy decoding its initial set of instruction bytes. Thus, instructions may be scanned and decoded out of program order. This may improve performance by preventing decode units 20A–B from stalling.

However, while out-of-order decoding may improve performance, decoding instructions out of order may cause difficulties further down the instruction processing pipeline when dependency checking is performed. Because most programs rely upon instructions executing in a particular order (i.e., "program order"), dependency checking is typically performed to determine which instructions may execute in an out-or-order fashion. Out-of-order execution may be used in conjunction with speculative execution of instructions to increase overall instruction throughout and performance.

In the embodiment illustrated in the FIG. 5, microprocessor 10 is configured to decode instructions out-of-order and then reorder them to allow in-order dependency checking. Reorder queue 122 is configured to perform this reordering. In one embodiment, reorder queue 122 comprises a plurality of storage lines, wherein each storage line comprises a fixed number of individual storage locations. Each storage location is configured to store a single decoded instruction. Accordingly, the size of each storage location will vary according to the particular implementation. For example, decoders 20A–B may decode instructions to a fixed 16-byte width. The number of storage locations within each line equals the maximum possible number of instructions decoded by each decode unit 20A–B. In the embodiment illustrated in the figure, each line has eight storage locations ($I_0$–$I_7$). In addition to the eight storage locations, each line may further comprise additional storage locations for address tags indicative of the program order of each line.

Each clock cycle, multiplexer 124 is configured to select the oldest three instructions within reorder queue 122 for dispatch to reorder buffer 32. The instructions are dispatched in program order, thereby allowing reorder buffer 32 to perform dependency checking in-order. Multiplexer 124 is configured to ignore empty storage locations within each line of instructions. Empty storage locations may occur when the number of instructions within a decoded instruction sequence is less than the maximum possible number of instructions. Furthermore, multiplexer 124 may be configured to select instructions from more than one line in a particular clock cycle. For example, assuming a particular line is only storing two instructions, multiplexer 124 may be configured to read an additional instruction from the following line in order to provide reorder buffer 32 with three instruction during that clock cycle. As previously noted, in one embodiment instructions are read and conveyed in program order to reorder buffer 32.

Once an instruction is read from a storage location within reorder queue 122, the storage location may be cleared or marked as empty, e.g., by setting or clearing a corresponding status bit. In one embodiment, once all storage locations within a particular line are empty, reorder queue 122 may be configured to shift the contents of each following line to fill in the empty line. In other embodiments, reorder queue 122 may be configured as a line-oriented FIFO or a line-oriented circular buffer.

In the embodiment shown, reorder buffer 32 receives three decoded and reordered instructions from multiplexer 124 each clock cycle. The instructions are stored in the order that they are received. The each line within reorder buffer stores three instructions. Each pending instruction is allocated a "reorder buffer tag" that identifies it as it proceeds throughout the execution pipeline. In one embodiment, the tag identifies which line within reorder buffer 32 the instruction is stored in. The tag may further include offset information to identify whether the instruction is the first, second, or third instruction within the line. Note, in other embodiments reorder buffer 32 may be configured with a different number of instructions per line, e.g., four instructions.

Reorder buffer 32 operates to keep track of the original program sequence for register read and write operations, implements register renaming, allows for speculative instruction execution and branch misprediction recovery, and facilitates precise exceptions. Reorder buffer 32 performs dependency checking to determine when an instruction may be "issued". Reorder buffer 32 issues instructions by conveying them to reservation stations 22A–C or load/store unit 26. Each reservation station acts as a buffer for the corresponding functional unit, storing instructions until they are executed. In one embodiment, reservations stations 22A–C monitor result bus 38 for results that are referenced as operands by stored instructions. If such a result is detected, the reservation station may forward the result to the corresponding pending instruction. Similarly, data from load instructions executed by load/store unit 26 may also be monitored and forwarded. The issued instructions then wait in reservation stations 22A–C or load/store unit 26 until the following criteria are met: (1) they have received all necessary operands and data, and (2) the corresponding functional unit's first execution pipeline stage is available to accept a new instruction. At that point, the instructions may enter functional units 24A–C for execution. As long as their are no dependencies, reorder buffer 32 allows instructions to issue and execute out-of-order. Advantageously, out-of-order execution in combination with speculative execution tends to increase performance by preventing functional units 24A–C from stalling. In the embodiment illustrated, instructions may be speculatively executed based upon branch prediction information stored in branch prediction unit 14.

As in the previous embodiment, each functional unit 24A–C is configured to perform integer arithmetic operations of addition and subtraction, as well as shifts, rotates, logical operations, and branch operations. A floating point unit (not shown) may also be employed to accommodate floating point operations. Results produced by functional units 24A–C are sent to reorder buffer 32 if a register value is being updated, and to the load/store unit 26 if the contents of a memory location is changed. As stated previously, results are also broadcast to reservation station units 22A–C where pending instructions may be waiting to receive their operand values from the results of previous instruction executions.

Register/future file 30 comprises two sets of registers. One set comprises the x86 architectural registers, including eight 32-bit real registers (i.e., EAX, EBX, ECX, EDX, EBP, ESI, EDI and ESP). The second set comprises registers for storing the most recent speculative set of values for each architectural register. This "future file" of registers provides a convenient place from which to forward speculative register values to pending instructions. If following decode of an instruction it is determined that reorder buffer 32 has a previous location or locations assigned to a register used as an operand in the instruction, then reorder buffer 32 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 32 rather than from register file 30. If there is no location reserved for a required register in reorder buffer 32, the value is taken directly from register file 30. If the operand corresponds to a memory location, the operand value is provided to the reservation station unit through load/store unit 26.

The results of each executed instruction are stored in reorder buffer 32 until the instruction is "retired". Retiring an instruction refers to copying the instruction's results to architectural register file 30 and thereby updating the microprocessor's non-speculative architectural state. As previously noted, reorder buffer tags follow each instruction through reservation stations 22A–C and functional units 24A–C. Thus, the results may be identified and attributed to the appropriate instruction within reorder buffer 32. Once the results are received, reorder buffer 32 retires instruction in-order in a line-by-line fashion, waiting to retire a line of instructions until the following conditions are met: (1) the line is the oldest line of instructions stored within reorder buffer 32, and (2) each instruction in the line has completed execution without an exception or branch misprediction. Note that other variations of reorder buffer 32 are also possible. For example, in another embodiment reorder buffer 32 may individually retire instructions as opposed to retiring them in a line-by-line manner. Reorder buffer 32 may be implemented in a first-in-first-out configuration wherein speculative results move to the "bottom" of the buffer as they are validated and written to register file 30, thus making room for new entries at the "top" of the buffer.

In the event of a branch misprediction, reorder buffer 32, reservation stations 22A–C, and load/store unit 26 may be configured to flush all pending instructions occurring after the misprediction branch instruction in program order. Furthermore, the contents of the architectural register file within register/future file 30 are copied to the future file to replace any erroneous values created by the execution of instructions along the mispredicted branch path. Branch mispredictions may be detected by functional units 24A–C, which forward the results of branch instructions to branch prediction unit 14. Load/store unit 26 and data cache 28 may be configured as previously.

Figure 6:
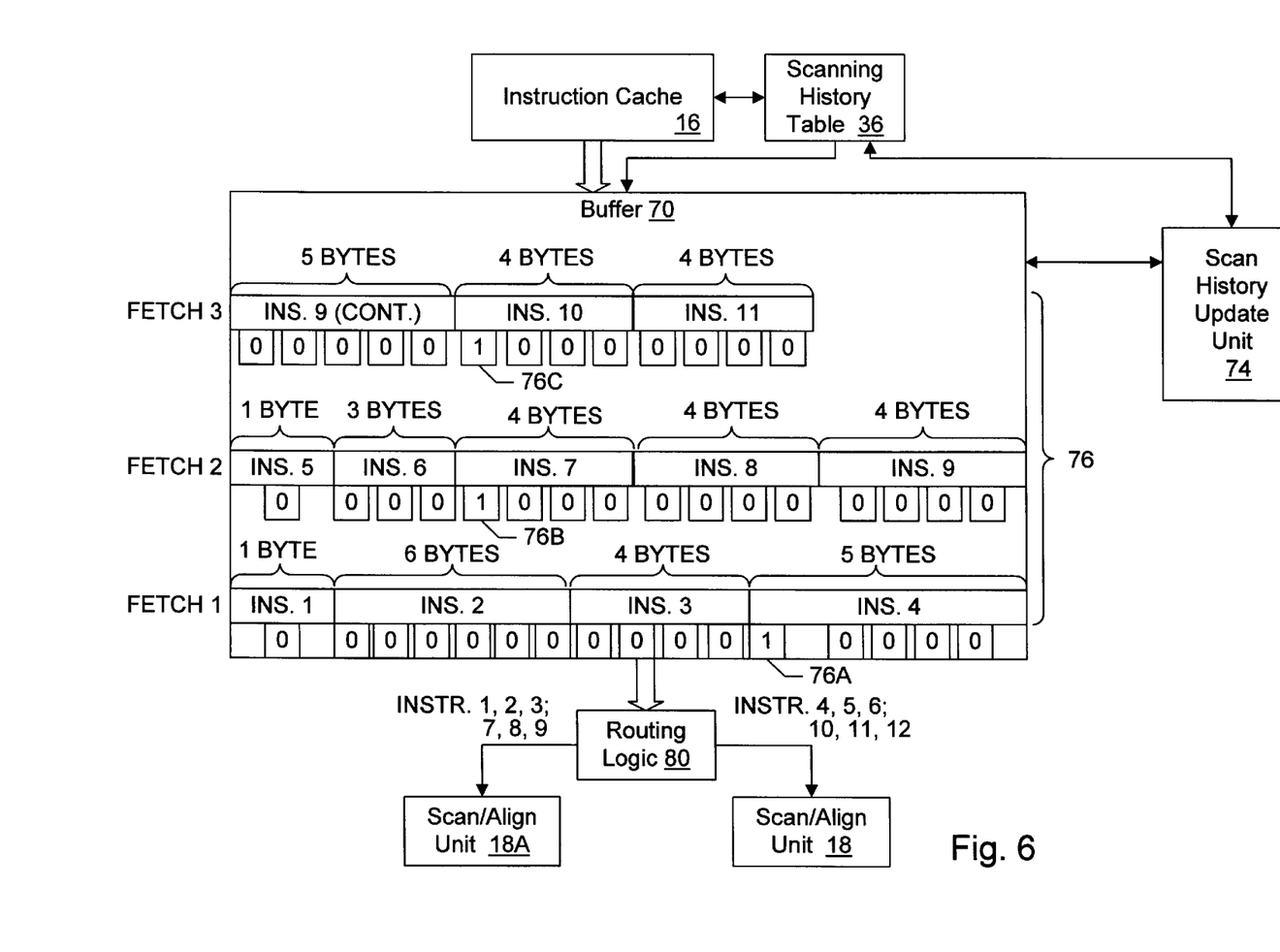
FIG. 6 is a block diagram illustrating details of one embodiment of the scanning history table and scan/align units from FIG. 5.

Turning now to FIG. 6, a diagram showing more details of the operation of one embodiment of scanning history table 36 and scan/align units 18A–B is shown. In this embodiment, a buffer 70 is coupled between instruction cache 16, scanning history table 36, and routing logic 80. Buffer 70 is configured to receive each cache line (or portion thereof) output by instruction cache 16 in response to a fetch address. In addition to receiving the instruction bytes output by instruction cache 16, buffer 70 is also configured to receive the corresponding predecode bits (not shown) from instruction cache 70 and the corresponding scan block indicator bits 76 from scanning history table 36. Buffer 70 acts as a first-in first-out (FIFO) memory, with the oldest bytes being output to routing logic 80 first. The instruction bytes are divided into instructions by their corresponding predecode bits. The instructions, in turn, are divided into scan blocks by their corresponding scan block indicator bits 76. Each asserted scan block indicator bit (e.g., bits 76A–C) marks the boundary of a scan block.

The figure illustrates an embodiment wherein the constant scan block size is three instructions (i.e., N equals three). Thus, during a first clock cycle, the first three instructions stored in buffer 70 (Ins. 1–3) are routed to scan/align unit 18A, while the next three instructions (Ins. 4–6) are routed to scan/align unit 18B. During the next clock cycle the process is repeated (i.e., Ins. 7–9 are routed to scan/align unit 18A while Ins. 10–11 are routed to scan/align unit 18B). At the end of each clock cycle, the contents of buffer 70 may be shifted so that the oldest instructions are at the "bottom".

Note that while instructions are loaded into buffer 70 by fetch block/cache line, individual scan blocks may cross fetch block boundaries. Also note that some fetch blocks may be smaller than a cache line, e.g., when a branch instruction in the middle of a cache line is predicted taken.

Update unit 76 may be optionally configured to count the number of instructions between asserted scan block indicator bits. If the number of instructions does not match the predetermined constant N (i.e., three in the example shown in the figure), then update unit 76 may adjust the asserted scan block indicator bits 76 as necessary to ensure that N instructions occur between each asserted scan block indicator bit. Update unit 76 may perform this adjustment by counting the number of start and or end bits between each asserted scan block indicator bit. As previously noted, the number of instructions between asserted scan block indicator bits may change when branch instructions go from predicted taken to predicted not taken. Similarly, the number of branch instructions may change when different branch target addresses are used or when executing self-modifying code.

Figure 7:
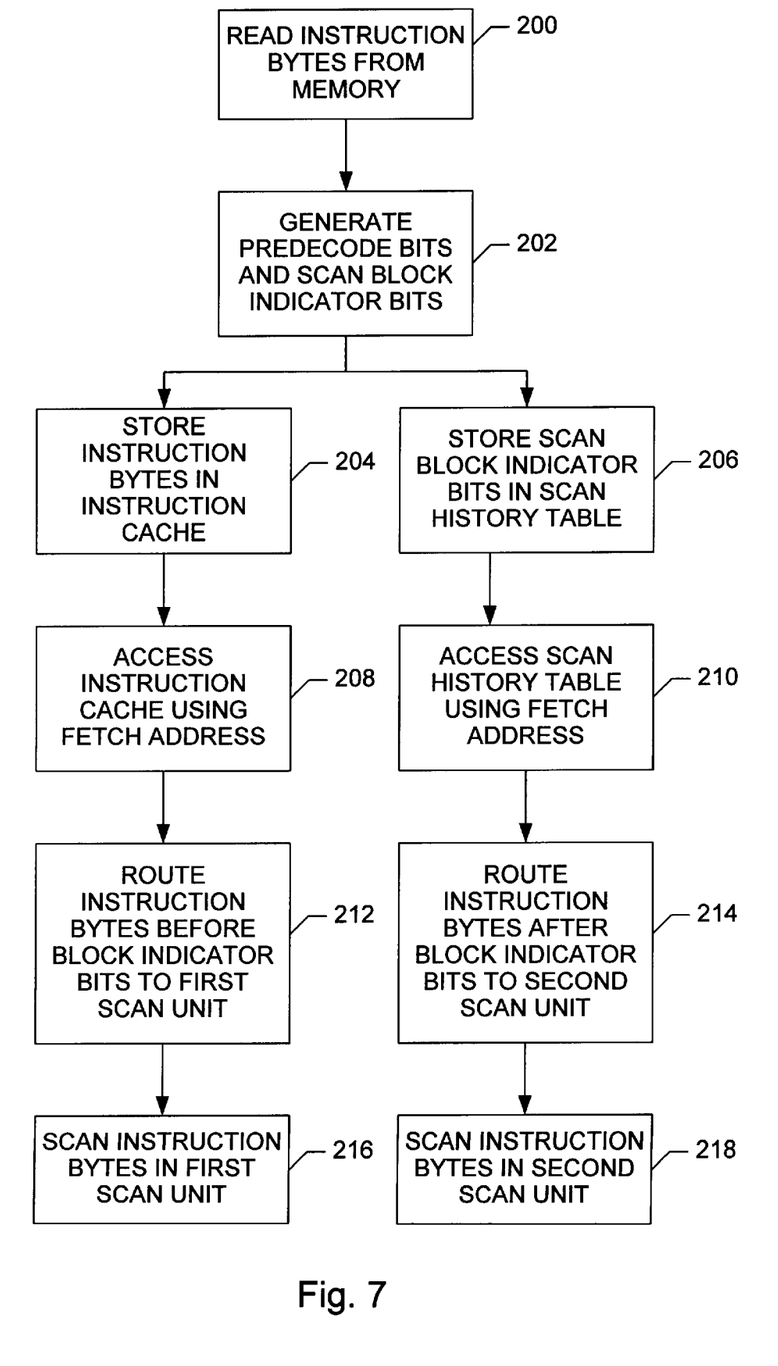
FIG. 7 is a flowchart illustrating one embodiment of a method for storing scan history information.

Turning now to FIG. 7, a flowchart illustrating one possible method for storing scanning history information is shown. In this embodiment, as instruction bytes are read from main memory (step 200), predecode bits and scan block bits are generated (step 202). The instruction bytes and predecode bits are stored in instruction cache 16 (step 204) in parallel with the scan block indicator bits being stored in scan history table 36 (step 206). When an instruction cache access occurs, both instruction cache 16 and scan history table 36 are accessed in parallel using the fetch address (steps 208 and 210). The scan block indicator bits output from scan history table 36 are used to route instruction bytes. Instruction bytes corresponding to byte positions before an asserted scan block indicator bit are routed to a first scan/align unit (e.g., scan/align unit 18A) (step 212), whereas instruction bytes corresponding to byte positions at or after the first asserted scan block indicator bit are routed to a second scan/align unit (e.g., scan/align unit 18B) (step 214). Finally, each scanner performs its scanning independently and in parallel (steps 216 and 218).

Figure 8:
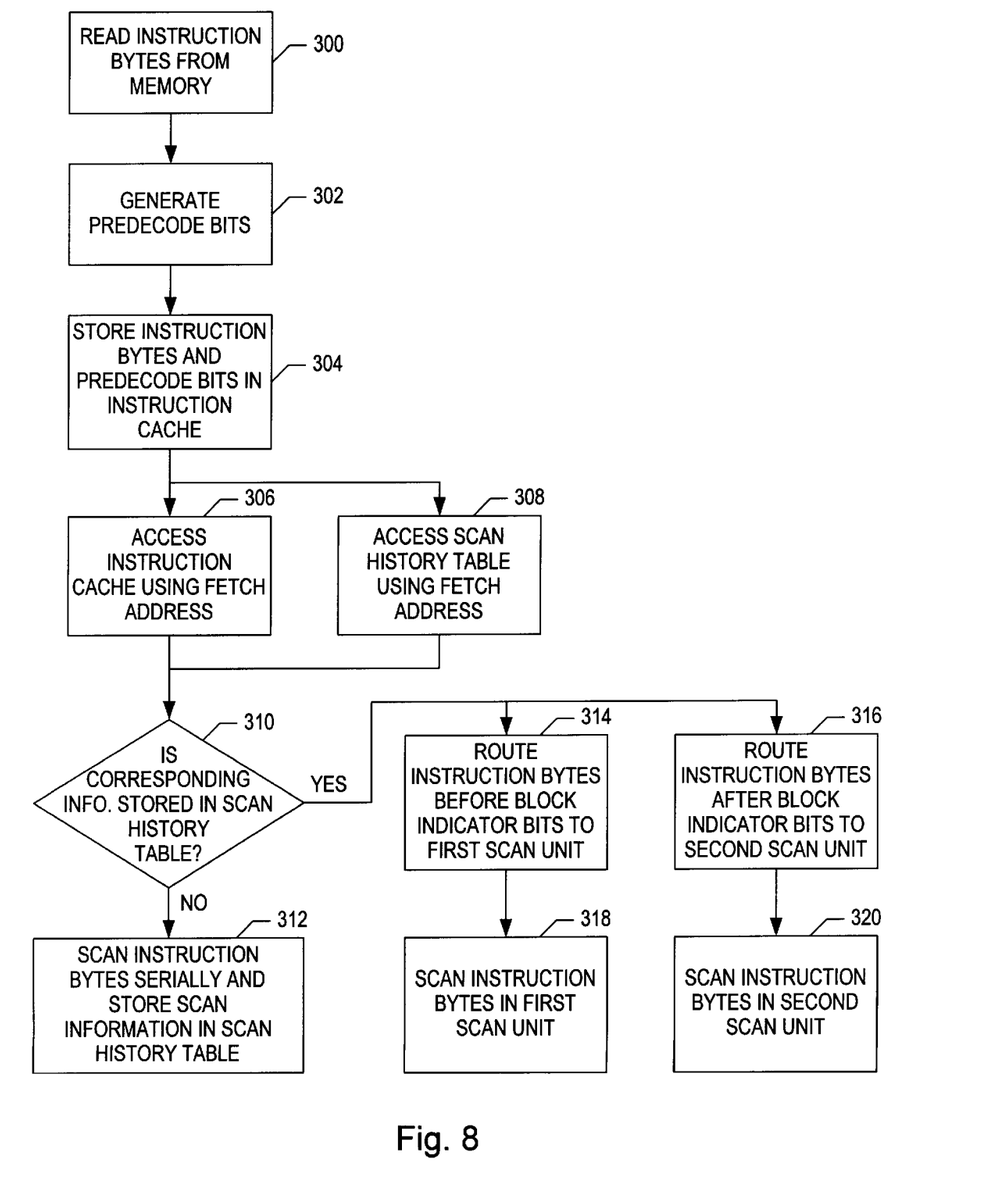
FIG. 8 is a flowchart illustrating another embodiment of a method for storing scan history information.

Turning now to FIG. 8, a flowchart illustrating another possible method for storing scanning history information is shown. In this embodiment, instruction bytes are once again read from main memory (step 300), and predecode bits are generated (step 302). The instruction bytes and predecode bits are then stored in instruction cache 16 (step 304). When instruction cache 16 is accessed with a fetch address (step 306), scan history table 36 is also accessed in parallel (step 308). The output from scan history table 26 is examined to determine if it is valid (step 310). If there is no valid scan history information, then the instruction bytes are scanned in the traditional manner (e.g., serially with shifting of partial instructions between the scan/align units), and the resulting scanning information is conveyed scan history table 36 for storage. If, however, scan history table 36 contains valid scan history information, then the scan block indicator bits output from scan history table 36 may be used to route instruction bytes. As in the previous embodiment, instruction bytes corresponding to byte positions before an asserted scan block indicator bit are routed to a first scan/align unit (e.g., scan/align unit 18A) (step 314), whereas instruction bytes corresponding to byte positions at or after the first asserted scan block indicator bit are routed to a second scan/align unit (e.g., scan/align unit 18B) (step 316). Finally, each scanner performs its scanning independently and in parallel (steps 318 and 320).

Exemplary Computer System

Figure 9:
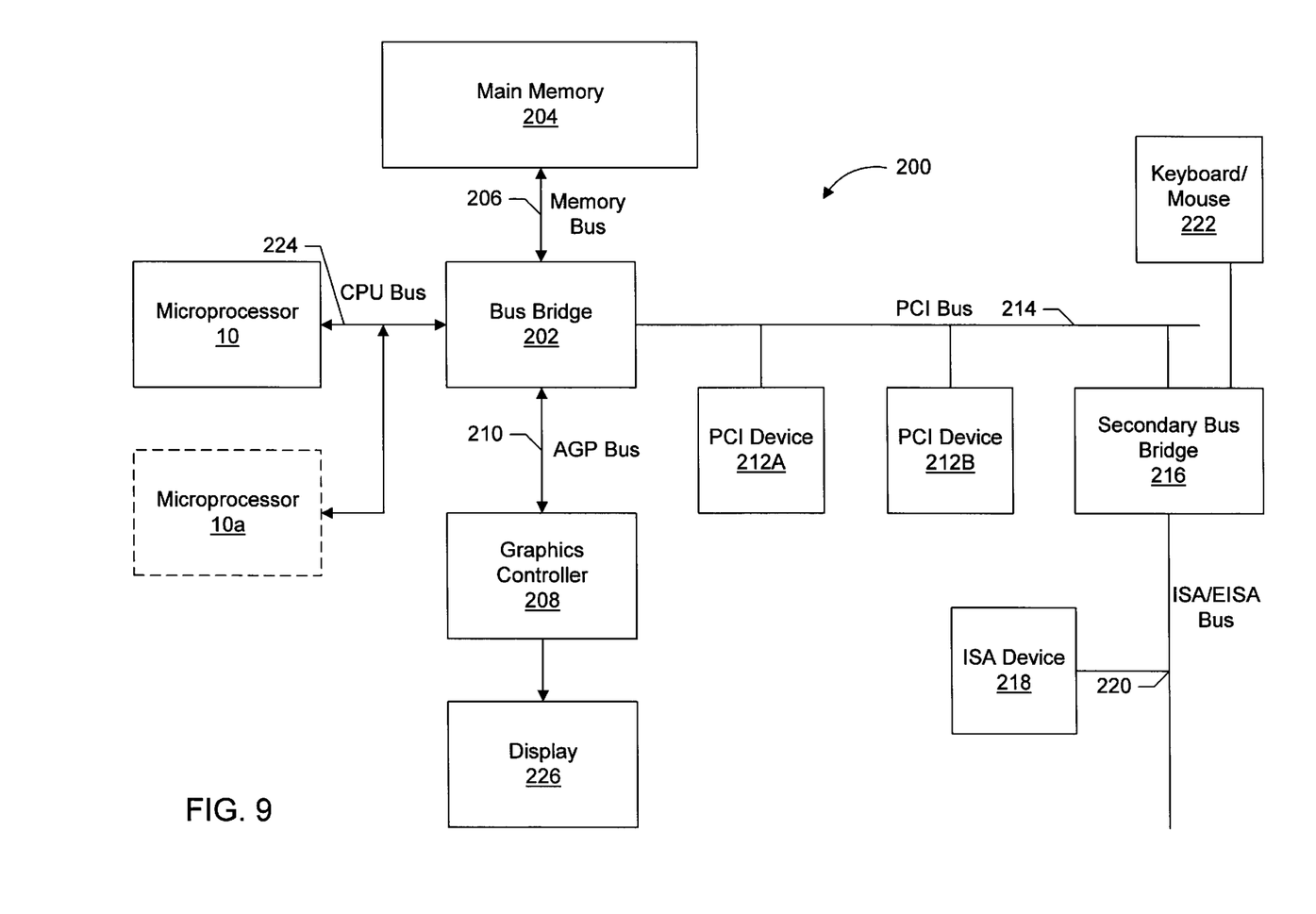
FIG. 9 is a block diagram of one embodiment of a computer system configured to use the microprocessor from FIGS. 3 or 5.

Turning now to FIG. 9, a block diagram of one embodiment of a computer system 200 configured to use microprocessor 10 is disclosed. Computer system 200 is coupled to a variety of system components through a bus bridge 202 as shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports (e.g., a modem port for connecting a modem), as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 5) or may be connected to bus bridge 202 via an independent bus.

What is claimed is:

1. A microprocessor comprising:
   an instruction cache configured to receive and store instruction bytes, wherein said instruction cache is configured to output a plurality of sequential instruction bytes in response to receiving a corresponding fetch address;
   a scanning history table coupled to said instruction cache, wherein said scanning history table is configured to store scan block boundary information, wherein said scanning history table is configured to output a first scan block boundary in response to receiving said corresponding fetch address;
   a first scanning unit coupled to said instruction cache and said scanning history table, wherein said first scanning unit is configured to receive instruction bytes from said plurality of sequential instruction bytes that occur before said first scan block boundary; and
   a second scanning unit coupled to said instruction cache and said scanning history table, wherein said second scanning unit is configured to receive instruction bytes from said plurality of sequential instruction bytes that occur after said first scan block boundary.

2. The microprocessor as recited in claim 1, further comprising routing logic coupled between said instruction cache and said first and second scanning units, wherein said routing logic is configured to receive said first scan block boundary and said plurality of sequential instruction bytes, and wherein said routing logic is configured to output instruction bytes occurring before said first scan block boundary to said first scanning unit, and wherein said routing logic is configured to output instruction bytes occurring after said first scan block boundary to said second scanning unit.

3. The microprocessor as recited in claim 2, wherein said scanning history table is configured to store one scan block boundary for each cache line in said instruction cache.

4. The microprocessor as recited in claim 2, wherein said scan block boundaries are stored in the form of scan block indicator bits, wherein one indicator bit is stored per instruction byte in said instruction cache.

5. The microprocessor as recited in claim 2, wherein said scanning history table is configured to store said scan block boundaries in the form of byte counts, wherein each byte count is associated with a particular fetch tag.

6. The microprocessor as recited in claim 4, wherein said first and second scanning units are configured to operate independently and in parallel.

7. The microprocessor as recited in claim 6, further comprising a predecode unit coupled between said instruction cache and said main memory, wherein said predecode unit is configured to generate one or more predecode bits for each instruction byte received from said main memory, wherein one of said predecode bits is said scan block indicator bit, and wherein said scan block indicator bit is indicative of the start of each Nth instruction, wherein N is an integer greater than one.

8. The microprocessor as recited in claim 7, wherein said predecode unit is coupled to said scan history table, and wherein said predecode unit is configured to store said indicator bits into said scan history table.

9. The microprocessor as recited in claim 5, further comprising a predecode unit coupled between said instruction cache and said main memory, wherein said predecode unit is configured to generate byte counts corresponding to the number of bytes in each N instruction sequence, wherein N is an integer greater than one.

10. The microprocessor as recited in claim 9, wherein said predecode unit is coupled to said scan history table, and wherein said predecode unit is configured to store said byte counts bits into said scan history table.

11. The microprocessor as recited in claim 10, further comprising a plurality of decode units, wherein each decode unit is configured to convey instruction start information to said scan history table.

12. The microprocessor as recited in claim 8, wherein said scan history table is implemented as a series of predecode bits within said instruction cache.

13. The microprocessor as recited in claim 1, further comprising a third scanning unit coupled to said instruction cache and said scanning history table, wherein said scanning history table is configured to output a second scan block boundary in response to said requested fetch address, wherein said second scanning unit is configured to receive instruction bytes from said plurality of sequential instruction bytes that occur after said first scan block boundary and before said second scan block boundary, and wherein said third scanning unit is configured to receive instruction bytes from said plurality of sequential instruction bytes that occur after said second scan block boundary.

14. A method for scanning instructions comprising:
reading a plurality of instruction bytes from a main memory into an instruction cache;
generating scan block boundary indicator bits for the plurality of instruction bytes;
storing the scan block indicator bits into a scan history table;
accessing the instruction cache and scan history table with a fetch address; and
routine instruction bytes from the instruction cache to two or more parallel scan units according to the scan block indicator bits output by the scan history table.

15. The method as recited in claim 14, wherein said scan block boundary indicator bits mark the boundary between every N instructions, wherein N is a predetermined integer greater than one.

16. The method as recited in claim 15, further comprising verifying the accuracy of the scan block indicator bits output by the scan history table and updating inaccurate scan block indicator bits stored in the scan history table.

17. A method for scanning instructions comprising:
reading a plurality of instruction bytes from an instruction cache using a fetch address;
searching a scan history table to determine if scan history information corresponding to the fetch address is stored therein;
if no valid corresponding scan history information is stored, scanning the instruction bytes serially and storing the newly generated scan history information in the scan history table; and
if corresponding scan history information is stored, dividing the instruction bytes into two or more scan blocks for parallel scanning, wherein the corresponding scan history information is used to determine where to divide the instruction bytes.

18. The method for scanning instructions as recited in claim 17, wherein the scan history information comprises byte count values corresponding to particular fetch addresses, wherein the byte count values are indicative of the boundary of each N instructions, wherein N is a predetermined constant integer greater than one.

19. A computer system comprising:
a first microprocessor;
a CPU bus coupled to said first microprocessor; and
a modem coupled to said CPU bus,
wherein said first microprocessor comprises:
an instruction cache configured to receive and store instruction bytes from a main memory, wherein said instruction cache is configured to output a plurality of sequential instruction bytes in response to receiving a corresponding fetch address;
a scanning history table coupled to said instruction cache, wherein said scanning history table is configured to store scan block boundary information, wherein said scanning history table is configured to output a first scan block boundary in response to receiving said corresponding fetch address;
a first scanning unit coupled to said instruction cache and said scanning history table, wherein said first scanning unit is configured to receive instruction bytes from said plurality of sequential instruction bytes that occur before said first scan block boundary; and
a second scanning unit coupled to said instruction cache and said scanning history table, wherein said second scanning unit is configured to receive instruction bytes from said plurality of sequential instruction bytes that occur after said first scan block boundary.

20. The computer system are recited in claim 16, further comprising a second microprocessor coupled to said first microprocessor via said CPU bus.

* * * * *